Patented May 11, 1943

2,319,164

UNITED STATES PATENT OFFICE 2,319,164

PLASTIC PRODUCT AND PROCESS

Chester Snyder, Yonkers, N. Y., assignor to Liatex Corporation, New York, N. Y., a corporation of New York No Drawing. Application December 5, 1940, Serial No. 368,623

11 Claims. (Cl. 260—94)

This invention relates to the preparation of a synthetic product that is elastic and resilient. It is suitable for many purposes such as insulation, coatings, belting, etc. It is highly resistant to alkalis and acids.

In carrying out this invention, isobutene polymer, which is isobutene that has been polymerized until it has reached a solid plastic state and is sticky or tacky, is treated with terpin hydrate at a sufficiently elevated temperature to cause the evolution of $H_2O$, whereupon a product is formed that is highly elastic and resilient.

From investigations that have been made it seems likely that the following are the structural formulas for polymerized isobutene and terpin hydrate, respectively:

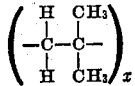

and

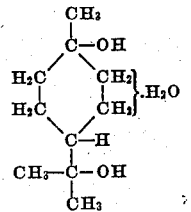

It is not known what the reactions are that take place when these two materials are heated together at elevated temperatures but it has been observed that there is an evolution of water vapor and some diminution in weight with a change in color and loss of tackiness and changes in other properties taking place. The resulting product becomes tougher and much more elastic than the polymerized isobutene and possesses much greater tensile strength. Even small amounts of terpin hydrate added to the polymerized isobutene cause some reaction to take place and increase the toughness and elasticity and reduce the tackiness, but very much larger amounts may be used. These products can be made with a large range of proportions of terpin hydrate to the polymerized isobutene, say about 1 part of the former to 100 parts by weight of the latter up to about equal weights of the two. Curing of the resulting products with sulphur and the usual rubber accelerators such as tetramethyl thiuram disulphide, for example, (Tuads) can be effected.

The following example is given for illustrative purposes, but it is to be understood that the invention is not limited to the particular proportions or other specific details:

Example 1 part by weight of terpin hydrate is mixed with 64 parts of a solid isobutene polymer found on the market as Vistanex. The mixture is ground in a Banbury mill at a temperature somewhat above 212° F. for about five to thirty minutes, depending upon the size of the batch, the proportions of the compounds, the temperature, and the capacity of the machine.

The proportions of terpin hydrate to the isobutene polymer may range from about ⅟₆₄ of that given in the example to about equal weights of the two, and the temperature may be increased nearly to the decomposition point of the reaction product, which seems to be about 350° F.

The reaction product can be cured by adding sulphur and an accelerator and heating at atmospheric pressure or above at temperatures up to about 300° F. Accelerators such as Tuads or other accelerators may be added to shorten the time required for curing the reaction products. The effects of curing these reaction products are that the toughness and elasticity are increased and the tackiness and the tendency to cold-flow is greatly decreased.

What is claimed is:

1. The process which comprises heating together terpin hydrate and plastic polymerized isobutene sufficiently to cause evolution of water vapor.

2. The process which comprises heating together terpin hydrate and plastic polymerized isobutene sufficiently to cause evolution of water vapor, and continuing until tackiness disappears.

3. The process which comprises heating together terpin hydrate and plastic polymerized isobutene sufficiently to cause evolution of water vapor, and continuing until tackiness disappears and the resulting product becomes tough and elastic.

4. The process which comprises heating together terpin hydrate and plastic polymerized isobutene sufficiently to cause evolution of water vapor, and continuing until tackiness disappears and the resulting product becomes tough and elastic and its tensile strength is greatly increased.

5. The process which comprises causing terpin hydrate to react with plastic polymerized isobutene at a temperature sufficiently high to cause evolution of water vapor and for a sufficiently long time to form a resilient product.

6. The process which comprises causing terpin hydrate to react with plastic polymerized isobutene at a temperature sufficiently high to cause evolution of water vapor and for a sufficiently long time to form a resilient product while intimately mixing the same.

7. The process which comprises causing terpin hydrate to react with plastic polymerized isobutene at a temperature sufficiently high to cause evolution of water vapor and for a sufficiently long time to form a resilient product, and curing the resulting product by heating it with sulphur.

8. The process which comprises causing terpin hydrate to react with plastic polymerized isobutene at a temperature sufficiently high to cause evolution of water vapor and for a sufficiently long time to form a resilient product, and curing the resulting product by heating it with sulphur and an accelerator.

9. An elastic product resulting from the reaction of terpin hydrate upon plastic polymerized isobutene at a temperature sufficiently high to cause evolution of water vapor.

10. An elastic product resulting from the reaction of terpin hydrate upon plastic polymerized isobutene at a temperature sufficiently high to cause evolution of water vapor, and in the proportions of about 1 part of terpene hydrate to between 5 and 20 parts by weight of the plastic polymerized isobutene.

11. A product substantially free from tackiness resulting from the reaction of terpin hydrate upon plastic polymerized isobutene at a temperature sufficiently high to cause evolution of water vapor.

CHESTER SNYDER.